United States Patent
Chang (10) Patent No.: US 9,495,036 B2
(45) Date of Patent: Nov. 15, 2016

(54) INPUT SYSTEM UTILIZING STYLUS PEN WHICH RECEIVES ELECTRICAL SIGNALS VIA CONNECTION LINK

(75) Inventor: Yaw-Guang Chang, Tainan (TW)

(73) Assignee: HIMAX TECHNOLOGIES LIMITED, Tainan (TW)

(*) Notice: Subject to any disclaimer, the term of this patent is extended or adjusted under 35 U.S.C. 154(b) by 481 days.

(21) Appl. No.: 13/452,936

(22) Filed: Apr. 23, 2012

(65) Prior Publication Data

US 2013/0278509 A1    Oct. 24, 2013

(51) Int. Cl.
*G06F 3/033* (2013.01)
*G06F 3/041* (2006.01)
*G06F 3/044* (2006.01)
*G06F 3/0354* (2013.01)

(52) U.S. Cl.
CPC ......... *G06F 3/0416* (2013.01); *G06F 3/03545* (2013.01); *G06F 3/044* (2013.01)

(58) Field of Classification Search
CPC .......... G06F 3/03545; G06F 3/03546; G06F 3/0416; G06F 3/044
USPC .............................. 345/173, 179; 178/19.03
See application file for complete search history.

(56) References Cited

U.S. PATENT DOCUMENTS

| | | | |
|---|---|---|---|
| 2009/0153152 A1* | 6/2009 | Maharyta | G06F 3/044 324/684 |
| 2010/0066693 A1* | 3/2010 | Sato et al. | 345/173 |
| 2011/0169775 A1 | 7/2011 | Liaw | |
| 2012/0068964 A1* | 3/2012 | Wright | G06F 3/044 345/174 |
| 2012/0256869 A1* | 10/2012 | Walsh et al. | 345/174 |
| 2013/0169582 A1* | 7/2013 | Ryshtun | 345/174 |
| 2013/0207925 A1* | 8/2013 | Ryshtun | G06F 3/044 345/174 |
| 2013/0207939 A1* | 8/2013 | Kremin | G06F 3/044 345/179 |

FOREIGN PATENT DOCUMENTS

| | | |
|---|---|---|
| TW | M387304 | 8/2010 |
| TW | 201144823 | 12/2011 |
| TW | 201207675 | 2/2012 |

* cited by examiner

*Primary Examiner* — Adam J Snyder
(74) *Attorney, Agent, or Firm* — Winston Hsu; Scott Margo (57) ABSTRACT

An input system includes a touch panel, a control circuit, a stylus pen, and a connection link. The control circuit generates an electrical signal. The stylus pen is external to the control circuit. The connection link is coupled between the control circuit and the stylus pen, and transmits the electrical signal to the stylus pen, wherein the electrical signal is coupled to the touch panel via the stylus pen. The connection link may be a wired link or a wireless link.

11 Claims, 8 Drawing Sheets

INPUT SYSTEM UTILIZING STYLUS PEN WHICH RECEIVES ELECTRICAL SIGNALS VIA CONNECTION LINK

BACKGROUND OF THE INVENTION

1. Field of the Invention

The disclosed embodiments of the present invention relate to an input system for receiving a user input, and more particularly, to an input system utilizing a connection link for transmitting an electrical signal to a stylus pen, wherein the electrical signal is coupled to a touch panel via the stylus pen.

2. Description of the Prior Art

A conventional capacitive stylus pen has a large nib contact area to touch a touch panel that utilizes an indium tin oxide (ITO) pattern so the contact position can be determined correctly. Please refer to FIG. 1, which is a diagram illustrating an input system 100 utilizing a capacitive stylus pen 110 having a small nib contact area NS1. An ITO pattern with diamond-shaped electrodes is shown on a touch panel 120, and a plurality of traces X1-X5 and Y1-Y5 are arranged to sense a plurality of electrode columns and a plurality of electrode rows for obtaining horizontal and vertical position information of the capacitive stylus pen 110, respectively.

Figure 1:
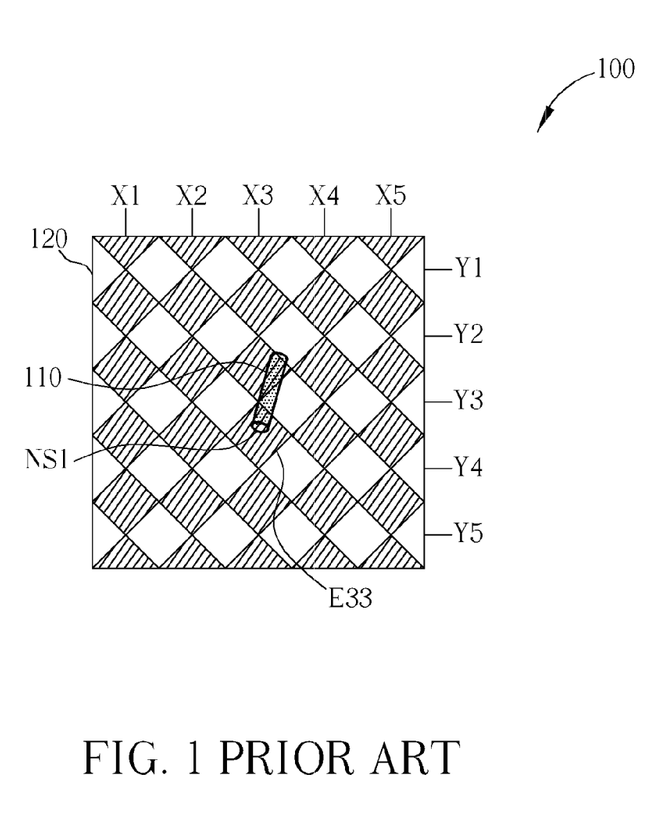
FIG. 1 is a diagram illustrating a conventional input system utilizing a capacitive stylus pen having a small nib contact area.
Figure 2A:
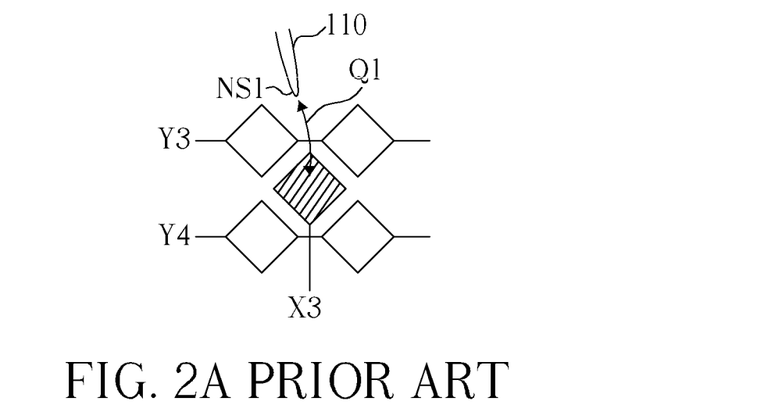
FIG. 2A is a diagram illustrating charges induced by a conventional capacitive stylus pen having a small nib contact area.
Figure 2B:
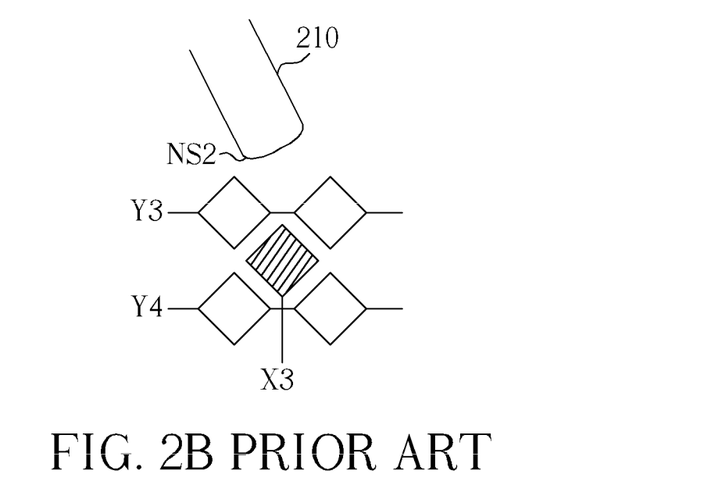
FIG. 2B is a diagram illustrating charges induced by a conventional capacitive stylus pen having a large nib contact area.

As shown in FIG. 1, the capacitive stylus pen 110 only touches the touch panel 120 at an electrode E33, which is one of the electrode columns corresponding to the trace X4, and is between two electrode rows corresponding to the traces Y3 and Y4. Please refer to FIG. 2A, which is a diagram illustrating charges induced by the capacitive stylus pen 110 and to FIG. 2B which is a diagram illustrating charges induced by another capacitive stylus pen 210 near the electrode E33, wherein the capacitive stylus pen 210 has a larger nib contact area NS2 compared to the nib contact area NS1. As shown in FIG. 2A, in a case where a sensing mode is self-capacitance sensing, an induced charge Q1 is sensed on the trace X3, while few induced charges are sensed on the traces Y3 and Y4 due to the small nib contact area NS1. Only the X-axis coordinate of the capacitive stylus pen 110 is obtained, and therefore the capacitive stylus pen 110 cannot be positioned correctly. As a person skilled in the art can understand that the same problem exists for a mutual-capacitance sensing mode, further description is omitted.

One conventional method to solve the above problem is to increase a contact area of a capacitive stylus pen. Please refer to FIG. 2B again. Due to the larger nib contact area NS2, more induced charges are sensed on the trace X4, the traces Y3, and the trace Y4, which enables the capacitive stylus pen 210 to be positioned correctly, i.e., the contact position can be determined correctly. As a real pen usually has a sharp nib, however, a user would have a more real writing experience when using the capacitive stylus pen 110. There is therefore a need for an innovative input system which can provide the user with a more natural writing experience without degrading the positioning performance when a capacitive stylus pen with a small nib contact area is used.

SUMMARY OF THE INVENTION

In accordance with exemplary embodiments of the present invention, an input system for coupling an electrical signal to a touch panel via a stylus pen is proposed to solve the above-mentioned problem.

According to an embodiment of the present invention, an exemplary input system is disclosed. The exemplary input system includes a touch panel, a control circuit, a stylus pen, and a connection link. The control circuit generates an electrical signal; and the connection link, coupled between the control circuit and the stylus pen, transmits the electrical signal to the stylus pen, wherein the electrical signal is coupled to the touch panel via the stylus pen and the stylus pen is external to the control circuit. The connection link may be a wired link or a wireless link, depending upon actual design considerations/requirements.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is electrically connected to another device, that connection may be through a direct electrical connection, or through an indirect electrical connection via other devices and connections.

Figure 3:
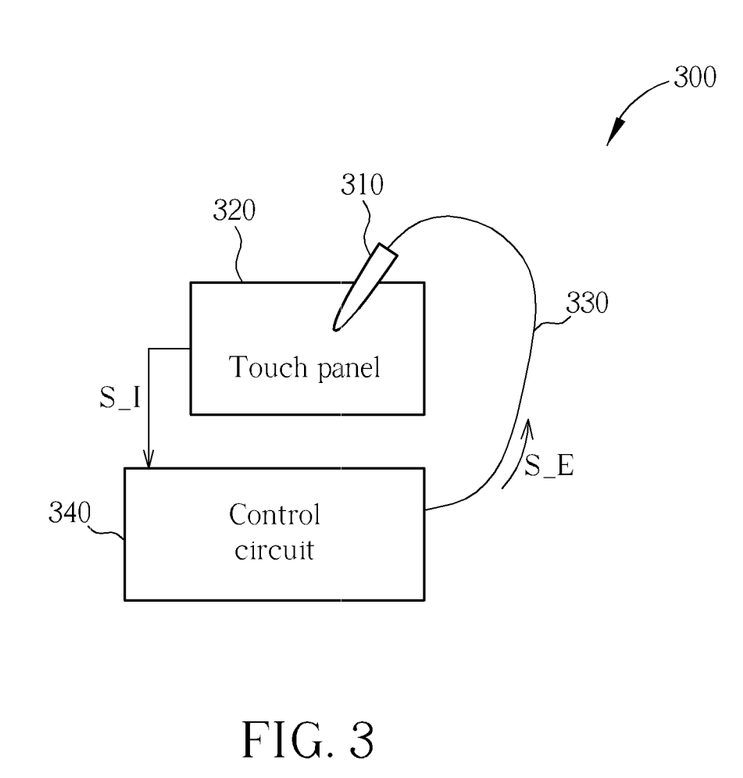
FIG. 3 is a diagram illustrating an exemplary input system according to an embodiment of the present invention.

Please refer to FIG. 3, which is a diagram illustrating an exemplary input system 300 according to an embodiment of the present invention. The exemplary input system 300 includes, but is not limited to, a stylus pen 310, a touch panel 320, a connection link 330, and a control circuit 340. As shown in FIG. 3, the stylus pen 310 is external to the control circuit 340, and the control circuit 340 generates an electrical signal S_E to the stylus pen 310 through the external connection link 330 coupled between the control circuit 340 and the stylus pen 310, where the transmitted electrical signal S_E is coupled to the touch panel 320 via the stylus pen 310. By way of example, but not limitation, the connection link 330 may be a wired link (e.g., a conductive wire) or a wireless link (e.g., infrared transmission). Please note that, by coupling the electrical signal S_E to the touch panel 320, insufficient induced charges associated with the conventional art may be avoided even if a nib contact area of the stylus pen 310 is small. Therefore, the nib size of the stylus pen 310 may be reduced to provide the user with a more real writing experience. In addition, as the electrical signal S_E is generated from the control circuit 340 external to the stylus pen 310, no additional circuits are needed within the stylus pen 310. The architecture of the stylus pen 310 is simple, and the weight of the stylus pen 310 is low. Therefore, the user can write more easily and conveniently. In addition, when an input signal S_I is induced due to a touch event of the stylus pen 310, the control circuit 340 may further detect the touch event by processing the input signal S_I multiple times for obtaining more precise detection quality.

In short, an input system obeys the spirit of the present invention as long as an electrical signal, generated externally to a touch object (e.g., a stylus pen), is coupled to an input interface (e.g., a touch panel) via the touch object.

Figure 4:
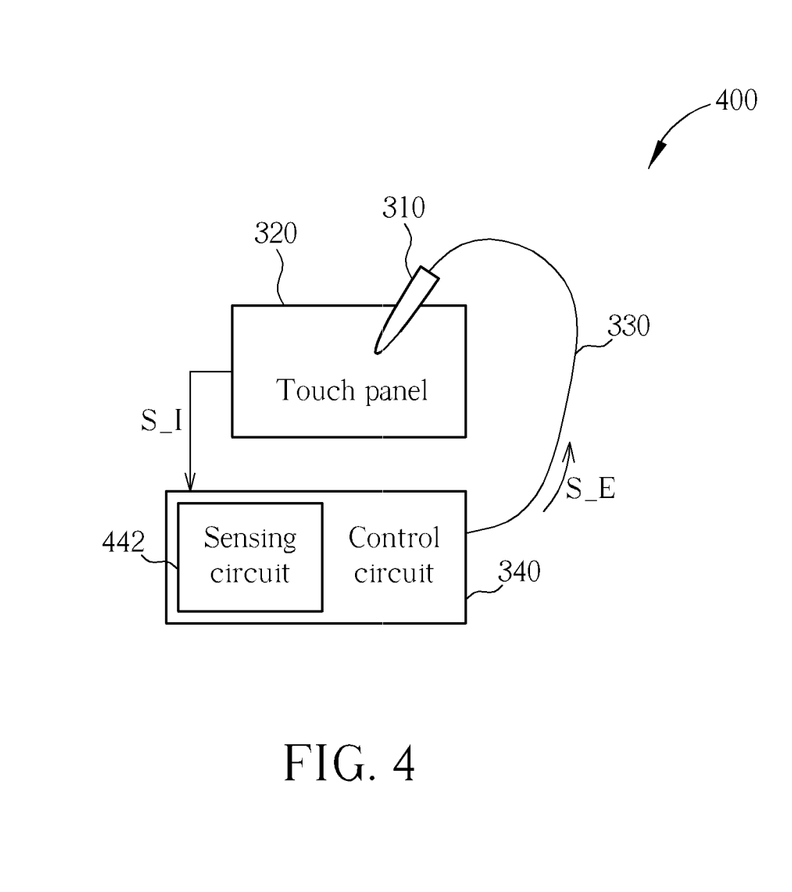
FIG. 4 is diagram illustrating an exemplary input system according to another embodiment of the present invention.

Please refer to FIG. 4, which is a diagram illustrating an exemplary input system 400 according to another embodiment of the present invention. The architecture of the input system 400 is based on that of the input system 300, where the major difference is that the control circuit 340 includes a sensing circuit 442. The sensing circuit 442 is arranged to generate a sensing output of a touch event according to an input signal S_I induced due to the stylus pen 310, and while the stylus pen 310 is transmitting the electrical signal S_E with a first level (e.g., a logic high level), the sensing circuit 442 receives the input signal S_I synchronously. By utilizing the proposed architecture of the present invention, the input system 400 is capable of performing transmission (TX) and reception (RX) synchronously, which may effectively improve the signal-to-noise (SNR) ratio. When the sensing circuit 442 is processing the input signal S_I received from the touch panel 320, the stylus pen 310 may transmit the electrical signal S_E with a second level (e.g., a logic low level) different from the first level. Both reception and processing of the input signal S_I may be performed according to the electrical signal S_E generated from the control circuit 340.

Figure 5:
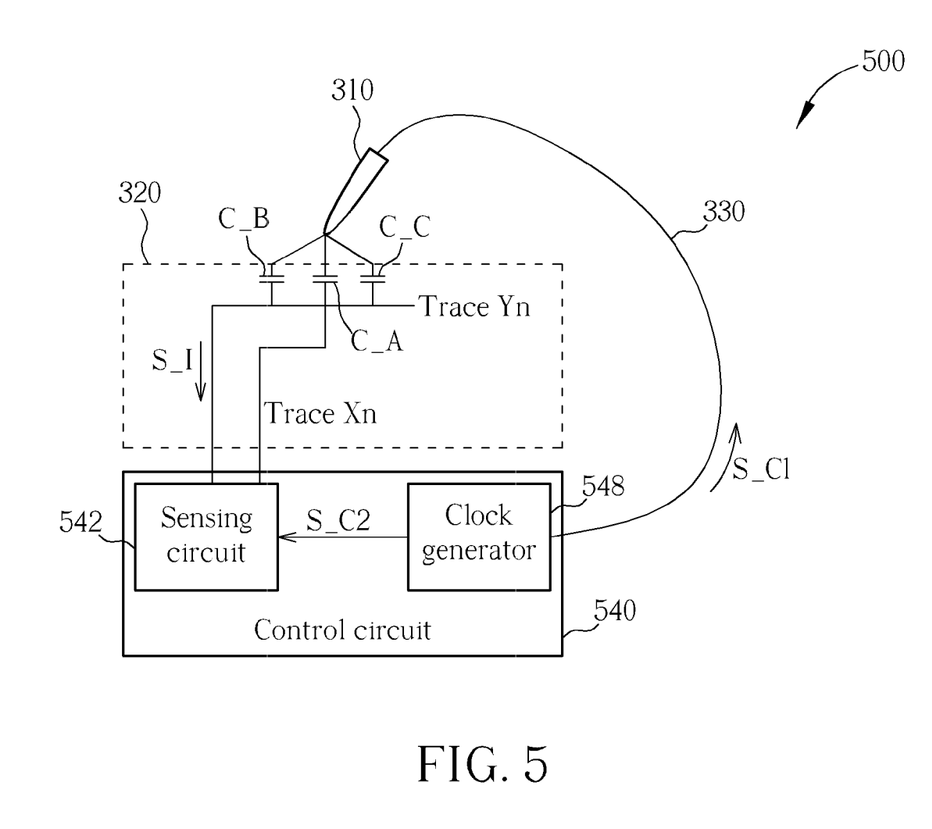
FIG. 5 is diagram illustrating an exemplary input system according to another embodiment of the present invention.

Please refer to FIG. 5, which is a diagram illustrating an exemplary input system 500 according to another embodiment of the present invention, wherein the architecture of exemplary input system 500 is based on that of the input system 300. In this embodiment, the input system 500 includes a control circuit 540, wherein the control circuit 540 is designed to have a sensing circuit 542 and a clock generator 548 included therein. In addition, the control circuit 540 generates a first clock signal S_C1 (the electrical signal S_E in FIG. 3) to be coupled to the touch panel 320 via the stylus pen 310. The sensing circuit 542 is coupled to the touch panel 320, and senses a touch event according to at least one second clock signal S_C2 and an input signal S_I induced due to the stylus pen 310. The clock generator 548 is coupled to the sensing circuit 542 and the connection link 330, and generates the first clock signal S_C1 and the at least one second clock signal S_C2.

When a user writes on the touch panel 320 by using the stylus pen 310, the clock generator 548 generates the first clock signal S_C1 to be coupled to the touch panel 320 via the stylus pen 310. The input signal S_I is induced from the electrode column(s) and/or electrode row(s) in FIG. 1. In a case where the sensing mode is self-capacitance sensing, the input signal S_I may be charges induced via a parasitic capacitor C_A between the stylus pen 310 and an electrode (not shown in FIG. 5) corresponding to a trace Xn, and via parasitic capacitors C_B and C_C between the stylus pen 310 and electrodes (not shown in FIG. 5) corresponding to a trace Yn. During a first half period of the first clock signal S_C1, the sensing circuit 542 may receive the input signal S_I while the stylus pen 310 synchronously transmits the first clock signal S_C1 with a first level (e.g., a logic high level). In other words, the input system 500 is capable of performing transmission (TX) and reception (RX) synchronously, which may effectively improve the signal-to-noise (SNR) ratio. During a second half period of the first clock signal S_C1 (the remaining part of one full period of the first clock signal S_C1), the sensing circuit 542 may process the received input signal S_I and the stylus pen 310 may transmit the first clock signal S_C1 with a second level (e.g., a low logic level) different from the first level. In addition, the second clock signal S_C2 may control the sensing circuit 542 to receive and process the input signal S_I. Please refer FIG. 6 for a more detailed illustration.

Figure 6:
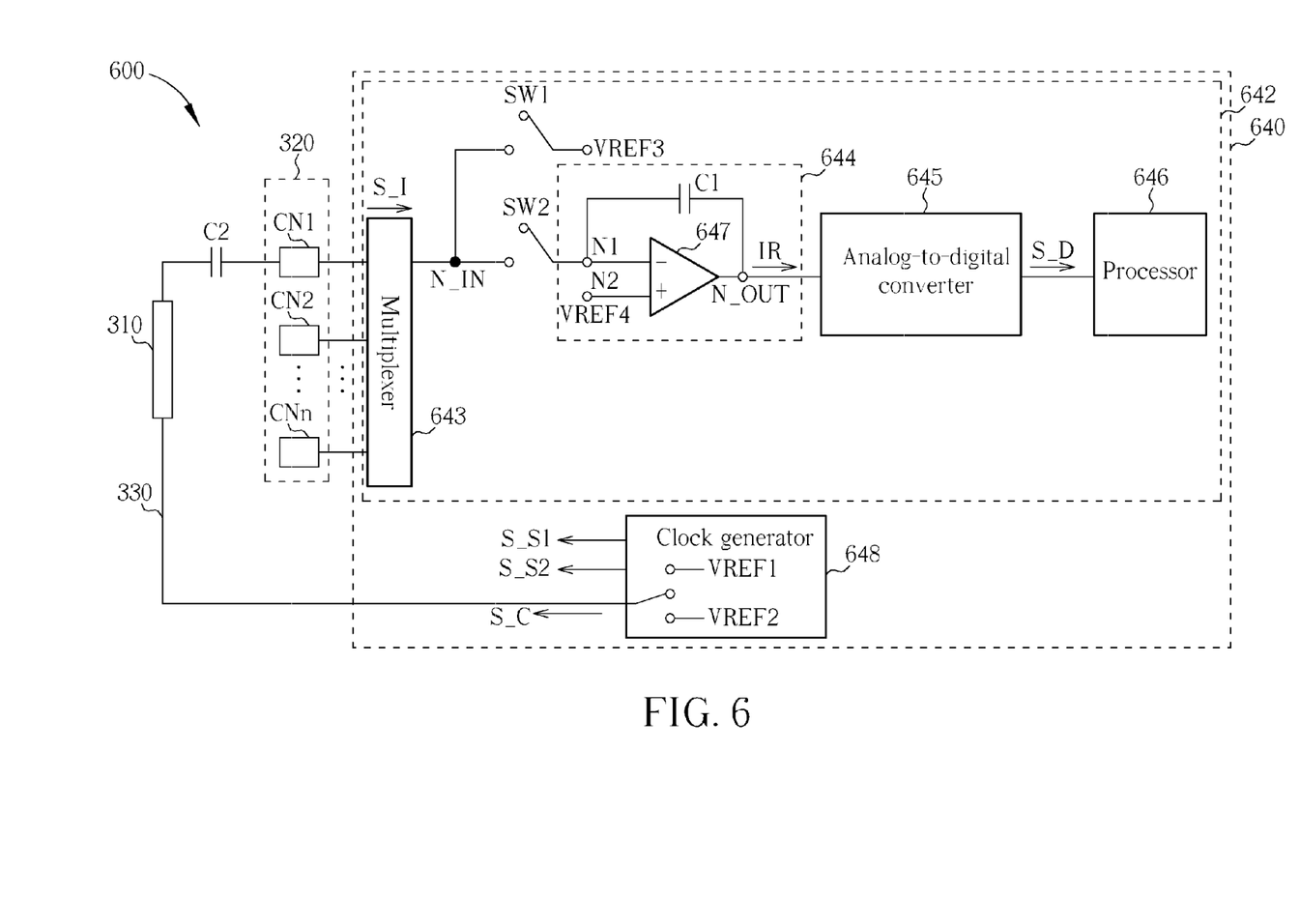
FIG. 6 is diagram illustrating an exemplary input system according to another embodiment of the present invention.

FIG. 6 is a diagram illustrating an exemplary input system 600 according to another embodiment of the present invention, wherein the architecture of the exemplary input system 600 is based on those of the input systems 300 and 500. In this embodiment, the input system 600 includes a control circuit 640, wherein the control circuit 640 is designed to have a sensing circuit 642 and a clock generator 648 included therein. The sensing circuit 642 includes a multiplexer 643, a first switch SW1, a second switch SW2, and an integrator 644. In this embodiment, the integrator 644 is implemented by a capacitor C1 and an operational amplifier 647.

The clock generator 648 generates a first clock signal S_C alternately having a first level VREF1 and a second level VREF2, and generates second clock signals including at least a first switch control signal S_S1 and a second switch control signal S_S2. In this embodiment, the first switch SW1 is controlled by the first switch control signal S_S1 to selectively couple a first reference voltage VREF3 to an input node N_IN utilized for receiving the input signal S_I. The integrator 644 has a first input port N1 for receiving the received input signal S_I, a second input port N2 for receiving a second reference voltage VREF4, and an output port N_OUT for outputting an integration result IR. The second switch SW2 is controlled by the second switch control signal S_S2 to selectively couple the input node N_IN to the first input port N1 of the integrator 644. By way of example, but not limitation, VREF1=3V, VREF2=0V, VREF3=1.5V, and VREF4=1.5V.

Figure 7A:
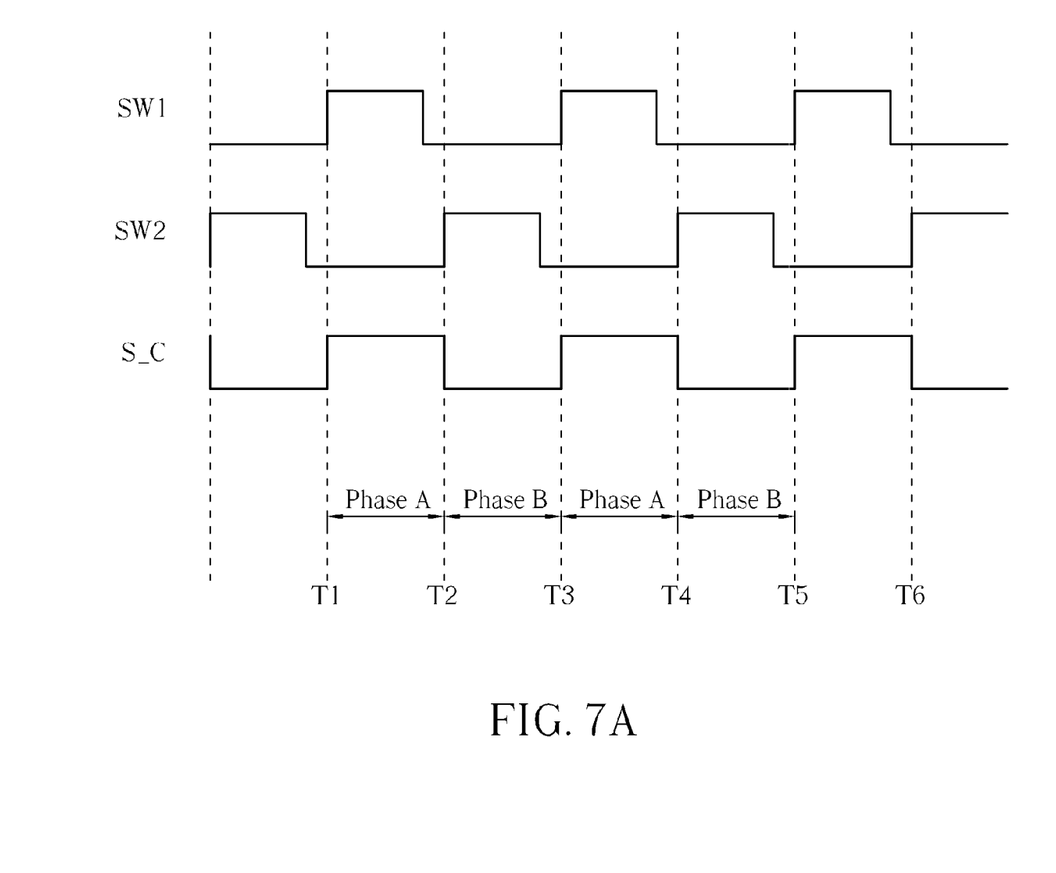
FIG. 7A is a timing diagram illustrating operations of switch control signals and a clock signal shown in FIG. 6.

Please refer to FIG. 7A for a detailed illustration. FIG. 7A is a timing diagram illustrating operations of the first switch control signal S_S1, the second switch control signal S_S2, and the first clock signal S_C shown in FIG. 6. In this embodiment, when the first switch control signal S_S1 is high, the first switch SW1 is closed (i.e., switched on) to couple the first reference voltage VREF3 to the input node N_IN, and when the first switch control signal S_S1 is low, the first switch SW1 is opened (i.e., switched off) to disconnect the first reference voltage VREF3 from the input node N_IN. Similarly, when the second switch control signal S_S2 is high, the second switch SW2 is closed (i.e., switched on) to couple the input node N_IN to the first input port N1, and when the second switch control signal S_S2 is low, the second switch SW2 is opened (i.e., switched off) to disconnect the input node N_IN from the first input port N1. As shown in FIG. 7A, phase A is entered when the first clock signal S_C is at the first level VREF1 (i.e., at a logic high level in this embodiment), and phase B is entered when the first clock signal S_C is at the second level VREF2 (i.e., at a logic low level in this embodiment). In addition, as can be seen from FIG. 7A, the first and second switch control signals SW1 and SW2 are non-overlapping clock signals for properly controlling the signal reception and signal processing of the sensing circuit 642, and each of the first and second switch control signals S_S1 and S_S2 have edges aligned with edges of the first clock signal S_C. More specifically, rising edges of the first switch control signal S_S1 are aligned with rising edges of the first clock signal S_C at time points T1, T3, and T5, and falling edges of the second switch control signal S_S2 are aligned with falling edges of the first clock signal S_C at time points T2, T4, and T6.

Please refer to FIG. 6 together with FIG. 7A. In a case where vertical traces X1-Xn (e.g., X-axis traces in FIG. 1) are scanned in turn, the multiplexer 643 selectively couples contact nodes CN1-CNn to the input node N_IN. The stylus pen 310 is coupled to the contact node CN1 via a parasitic capacitor C2, which means charges are induced on the parasitic capacitor C2 between the stylus pen 310 and electrodes corresponding to a trace X1 in the touch panel 320. The contact nodes CN2-CNn are floating because few charges are induced due to the stylus pen 310. When the trace X1 is scanned in phase A, the first clock signal S_C at the first level VREF1 is coupled to the touch panel 320 via the stylus pen 310. Because rising edges of the first switch control signal S_S1 are aligned with rising edges of the first clock signal S_C, the parasitic capacitor C2 is charged to a voltage difference between the voltages VREF1 and VREF3. Because rising edges of the second switch control signal S_S2 are aligned with falling edges of the first clock signal S_C, when the first clock signal S_C is switched to the second level VREF2, the second switch SW2 will be closed. In addition, as the first switch SW1 has been opened before the second switch SW2 is closed, charges stored in the parasitic capacitor C2 are transferred to the capacitor C1 in phase B. Therefore, an output voltage V_OUT (i.e., the integration result IR) at the output port N_OUT may be represented by the following equation:

$$V\_OUT = V\_initial + T\_INT \times (VREF1 - VREF3) \times (C2/C1) \quad (1)$$

In the above equation (1), the symbol "V_initial" represents an initial voltage of the output port N_OUT, and the symbol "T_INT" represents a number of clock cycles of the first clock signal S_C during integration.

Figure 7B:
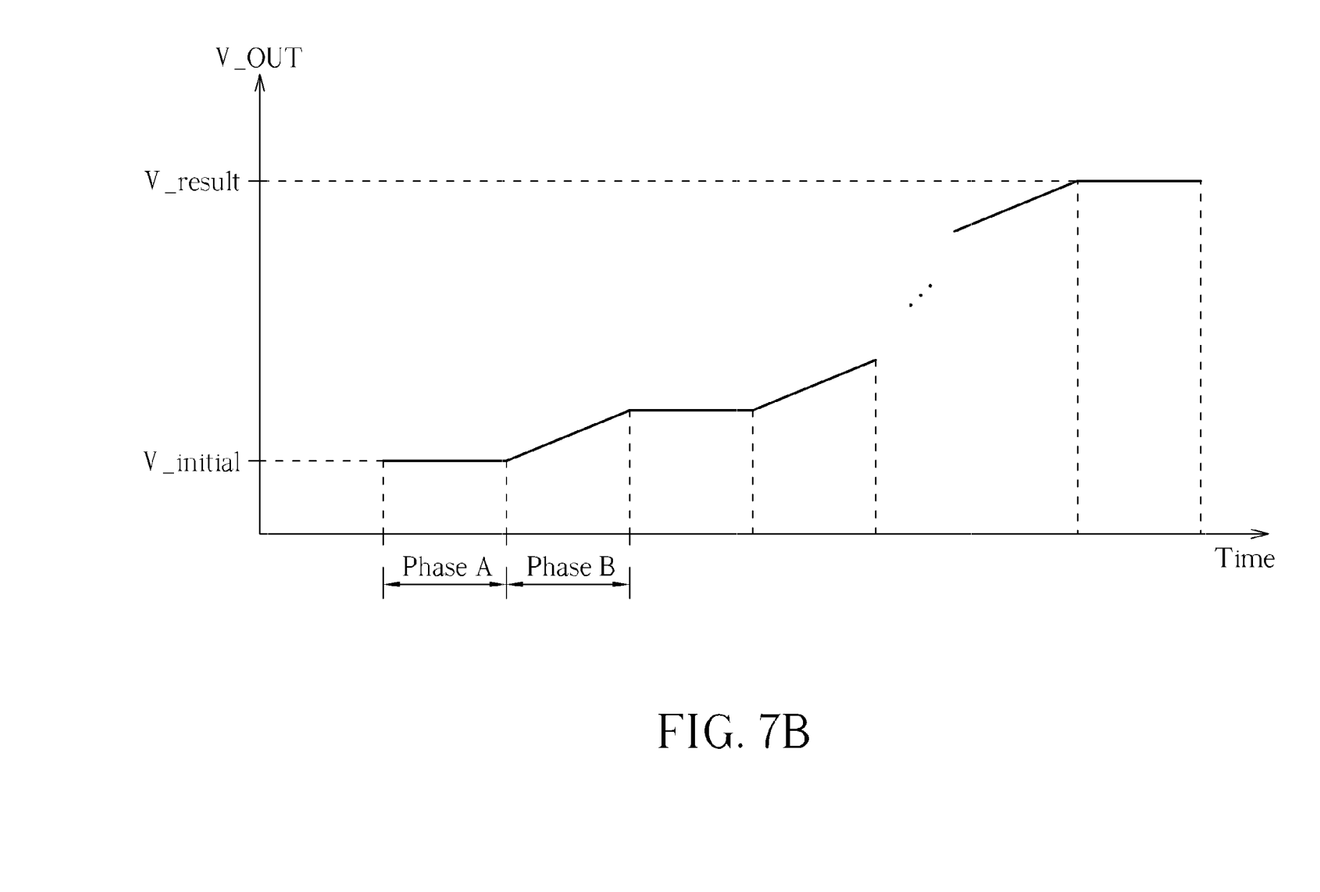
FIG. 7B is a diagram illustrating an output voltage variation during the integration operation.

Please refer to FIG. 7B, which is a diagram illustrating the output voltage V_OUT variation during the integration operation. As shown in FIG. 7B, the output voltage V_OUT is charged from the voltage V_initial to a voltage V_result after a plurality of integration operations. In this embodiment, the output voltage V_OUT corresponding to the trace X1 is higher than other traces X2-Xn, which means the parasitic capacitor corresponding to the trace X1 is larger, and therefore the horizontal position (i.e., the X-axis coordinate) of the stylus pen 310 is determined to be X1.

Please note that the above is only for illustrative purposes, and is not meant to be a limitation to the present invention. The integrator 644 may be implemented using other types of circuits, the sensing mode may be self-capacitance or mutual-capacitance sensing, and the number of multiplexers may be adjusted according to the employed sensing manner. For example, if there are two integrators disposed for processing two input signals from two traces, the number of multiplexers may be increased to two. In an alternative design, the first clock signal S_C may be inverted. Hence, the rising edges of the first switch control signal S_S1 are aligned with the falling edges of the first clock signal S_C, and the rising edges of the second switch control signal S_S2 are aligned with the rising edges of the first clock signal S_C. The first level VREF1 is a low level and the second level VREF2 is a low level, and the first and second switches SW1 and SW2 are closed when the first control signal S_C is at the low level.

As shown in FIG. 6, the sensing circuit 642 may further include an analog-to-digital converter 645 and a processor 646. The analog-to-digital converter 645 is coupled to the output port N_OUT of the integrator 647, and is used for converting the integration result IR into a digital signal S_D. The processor 646 is coupled to the analog-to-digital converter 645, and is used for receiving and processing the digital signal S_D to detect the touch event in the digital domain. Therefore, as the output voltage V_OUT is obtained, the analog-to-digital converter 645 then converts the output voltage V_OUT into the digital signal S_D for further processing.

To sum up, the present invention proposes an innovative input system which provides a user with a more natural writing experience. By generating an electrical signal externally and transmitting the generated electrical signal to a stylus pen via a connection link, the transmitted electrical signal is coupled to the touch panel via the stylus pen for enhancing the intensity of an input signal induced by the stylus pen. The stylus pen can have a sharp nib, a light weight, and a simple architecture, which facilitates the use of the stylus pen and makes the user have a more real writing experience. In addition, the input system is capable of performing transmission and reception synchronously to effectively improve the signal-to-noise (SNR) ratio.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An input system, comprising:
   a touch panel;
   a control circuit, for generating an electrical signal;
   a stylus pen, external to the control circuit; and
   a connection link, coupled between the control circuit and the stylus pen, for transmitting the electrical signal to the stylus pen, wherein the electrical signal is coupled to the touch panel via the stylus pen;
   wherein the control circuit comprises a sensing circuit; the sensing circuit is coupled to the touch panel, and is arranged for sensing a touch event at least according to an input signal induced due to the stylus pen; while the stylus pen is transmitting the electrical signal having a first voltage level, the sensing circuit synchronously receives the input signal; only when the stylus pen transmits the electrical signal having the first voltage level, the sensing circuit receives the input signal received from the touch panel; and when the stylus pen transmits the electrical signal having a second voltage level different from the first voltage level, the sensing circuit does not receive the input signal received from the touch panel.

2. The input system of the claim 1, wherein the electrical signal is a first clock signal, the sensing circuit senses the touch event according to at least one second clock and the input signal, and the control circuit further comprises:

a clock generator, coupled to the sensing circuit and the connection link, for generating the first clock signal and the at least one second clock signal.

3. The input system of the claim 2, wherein during a first half period of the first clock signal, the sensing circuit receives the input signal and the stylus pen synchronously transmits the first clock signal having the first voltage level.

4. The input system of the claim 3, wherein during a second half period of the first clock signal, the sensing circuit processes the received input signal and the stylus pen transmits the first clock signal having the second voltage level different from the first voltage level.

5. The input system of the claim 2, wherein the at least one second clock signal includes a first switch control signal and a second switch control signal, and the sensing circuit comprises:

a first switch, controlled by the first switch control signal to selectively couple a first reference voltage to an input node utilized for receiving the input signal;

an integrator, having a first input port for receiving the received input signal, a second input port for receiving a second reference voltage, and an output port for outputting an integration result; and a second switch, controlled by the second switch control signal to selectively couple the input node to the first input port of the integrator.

6. The input system of the claim 5, wherein the first and second switch control signals are non-overlapping clock signals, and each of the first and second switch control signals have edges aligned with edges of the first clock signal.

7. The input system of the claim 5, wherein the sensing circuit further comprises:

an analog-to-digital converter, coupled to the output port of the integrator, for converting the integration result into a digital signal; and a processor, coupled to the analog-to-digital converter, for receiving and processing the digital signal to detect the touch event.

8. The input system of the claim 1, wherein while the sensing circuit is processing the input signal received from the touch panel, the stylus pen transmits the electrical signal having the second voltage level different from the first voltage level.

9. The input system of the claim 1, wherein the control circuit further detects the touch event by processing the input signal multiple times.

10. The input system of the claim 1, wherein the connection link is a wired link.

11. The input system of the claim 1, wherein the connection link is a wireless link.

* * * * *